Patented June 4, 1929.

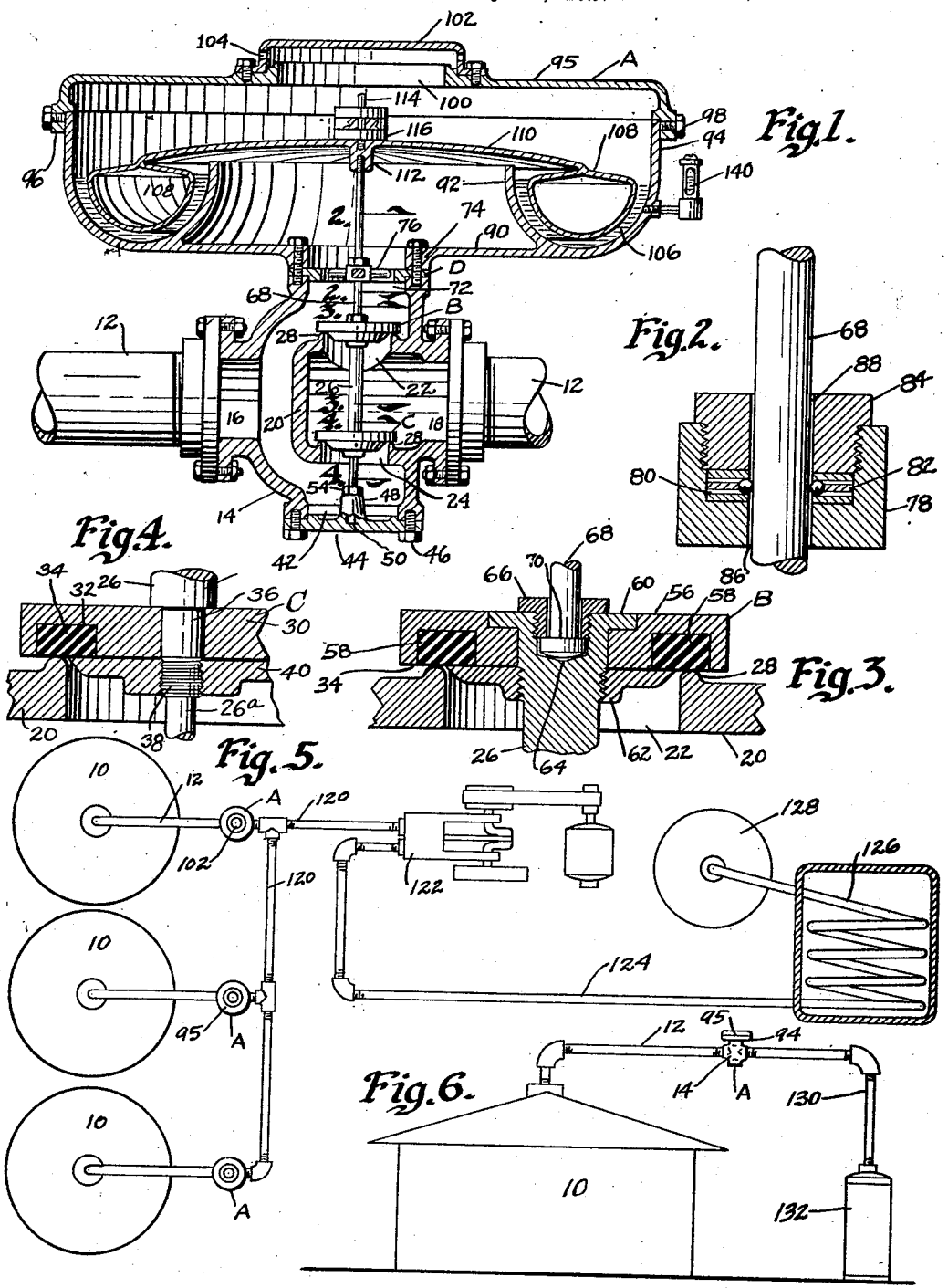

1,716,339

UNITED STATES PATENT OFFICE.

LYLE W. BROWNE, OF MARSHALLTOWN, IOWA, ASSIGNOR TO THE FISHER GOVERNOR COMPANY, INC., OF MARSHALLTOWN, IOWA.

VAPOR-COLLECTING VALVE.

Application filed May 21, 1927. Serial No. 193,310.

The purpose of my invention is to provide a vapor collecting valve, which may be used in connection with large storage tanks containing gasoline, crude oil or other content from which gases are formed or given out, that are likely to cause pressure in the storage tank.

It is my purpose to provide a vapor collecting valve, which can be connected with such a tank in such manner that the excess of gases in the tank may be passed through the valve.

More particularly, it is my object to provide such a valve of great sensitiveness, whereby any gas pressure in the storage tank may be relieved for thereby reducing the dangers due to excessive pressure in storage tanks.

With these and other objects in view, my invention consists in the construction, arrangement and combination of the various parts of my vapor collecting valve, whereby the objects contemplated are attained, as hereinafter more fully set forth, pointed out in my claims, and illustrated in the accompanying drawings, in which:

Figure 1 is a vertical, sectional view through a vapor collecting valve structure embodying my invention.

Figure 2 is a vertical, sectional view taken on the line 2—2 of Figure 1.

Figure 3 is a similar view taken on the line 3—3 of Figure 1.

Figure 4 is a detail, sectional view taken on the line 4—4 of Figure 1.

Figure 5 is a top or plan view of a series of tanks equipped with vapor collecting valves embodying my invention; and Figure 6 is a side elevation illustrating another type of installation in which the valve is used.

It is well known that where gasoline, crude oil and other liquids are stored in tanks, there is likely to be a formation of gases or vapors creating pressure in the upper parts of the tanks. These tanks are of great size and the existence of excessive pressure is likely to burst the top of the tank.

It is therefore, of course, highly desirable that a relief valve of some kind should be provided which will be extremely sensitive and so constructed as to be always accurately operative under all conditions to which the valve may be subjected.

It is, of course, very desirable that the parts of the valve should be readily and easily accessible for purposes of repair or replacement.

I have in my present valve produced such a structure.

In the accompanying drawings, I have used the reference numeral 10 to indicate generally a storage tank of the kind used for containing gasoline, crude oil and so forth.

For purposes of illustration, I have shown a battery of three tanks. Leading from the top of each tank 10 is a vent pipe 12.

My improved vapor collecting valve structure is indicated generally at A and is installed in the vent pipe 12 and is shown in detail in Figure 1.

There is provided a valve casing 14 having an inlet passage 16 and an outlet passage 18.

Projecting into the interior from the outlet side of the valve casing is a cage or the like 20 in which are the valve openings 22 and 24.

Valve heads B and C connected by a common stem 26 are arranged to coact with the valve seats 28.

In Figures 3 and 4 are shown details of the valve heads.

The valve head C comprises a body 30 having in its under surface an annular channel 32 to receive the composition valve disc 34. The body 30 is preferably made of aluminum alloy or other light material.

The stem or post 26 has a reduced portion 36 projected through the body 30 as shown in Figure 4. Below the reduced portion 36 is a reduced threaded portion 38 from which a smaller stem member 26ª projects downwardly.

Screwed onto the portion 38 is a disc 40 of less diameter than the valve opening 24 but of sufficient diameter to hold the composition disc 34 in place.

The lower part of the valve body has an opening 42 for which there is provided a cover plate 44 secured to the valve body by cap screws 46. On the upper surface of the plate 44 which forms a blind flange is a boss 48, in which is a socket 50 into which the stem member 26ª projects slidably.

The body of the upper valve head B is shown at 56 in Figure 3. It is also provided with an annular groove in its under surface indicated at 58 to receive the composition valve disc 34, similar to that already described.

The stem or post 26 extends through the valve head body 56 and may have at its upper end an annular flange 60 countersunk in the upper surface of the valve head body 56.

A lock nut 62 is screwed onto the stem 26 adjacent to the under side of the valve head body 56. The upper end of the stem 26 has a socket 64 into which is screwed a valve stem bushing 66.

A valve stem 68 is loosely extended through the bushing 66 and has a head 70 on its lower end as shown in Figure 3 for giving the valve stem or post 26 a rocking connection with the stem 68.

The upper part of the valve casing 14 has an opening 72. Resting on the upper part of the valve body is a spider guide D, comprising an annular ring 74 having radial inwardly extending arms 76, which support a central hub or guide 78 through which the stem 68 projects.

The spider guide hub 78 has in its upper surface a suitable socket 80 receiving a ball bearing structure 82, which is held in place by an upper bearing retaining nut 84, as illustrated in detail in Figure 2.

An opening 86 through the lower part of the spider guide hub 78 and the opening 88 in the nut 84 are large enough to avoid any binding of the stem 68.

It will thus be seen that the valve proper and the stem member 26ª and the stem 68 are made of light material and are so mounted that the valves may be of minimum weight and actuated with minimum friction.

It may here be mentioned that the boss 48 is provided with a bearing structure similar to the bearing structure 82 in the hub 78. A nut 54 serves to retain the bearing structure in position the same as the nut 84 in the hub 78.

I will now describe the valve operating means.

Mounted on the upper part of the valve casing 14 above the spider guide D is an annular plate 90 on the outer part of which is an upwardly opening channel-shaped member 92, which is substantially semi-cylindrical, except that the outer wall extends vertically upwardly from a line substantially flush with the upper edge of the inner wall as shown in Figure 1 at 94.

A cover cap 95 rests on the wall section 94 and has a downwardly, projecting flange 96 outside the wall 94 and fastened thereto by means of set screws 98.

In the cover plate 95 is an opening 100, which is normally covered by a detachable housing cover 102 in which is a vent hole 104.

The member 92 forms a float chamber.

The members 90, 92 and 95 form a diaphragm housing.

The float chamber 92 is designed to receive oil 106, which will not freeze, will not congeal in cold weather, and is not subject to deterioration on account of the contact with the gases to the action of which it may be subjected.

Floating in the oil 106 is a floating diaphragm, comprising an annular tubular member 108 and a connecting diaphragm plate 110 of concavo-convex form, as shown in Figure 1.

The plate 110 has a lug or boss 112 on its under side into which the upper end of the stem 68 is screwed as shown.

A post 114 projects upwardly from the center of the plate 110 and forms a satisfactory post to detachably support the removable weights 116.

The discharge passage 18 of the valve casing is connected with a pipe 120, which leads to a compressor 122. The compressor discharges through a pipe 124 through a condensing coil 126 to a receiving tank 128.

In Figure 6, I have shown a tank 10 from which leads a pipe 12 in which is a vapor collecting valve A, which discharges to a pipe 130 leading to a receiving tank 132. This is simply to illustrate another assembly for my improved vapor collecting valve.

I will now describe the practical operation of the valve and in connection therewith the construction and arrangement of the parts will be made clearer.

Assuming that the parts are assembled for instance as shown in Figure 5, it will be seen that if vapors or gases form in any of the parts of the tanks 10, these gases will naturally flow through the pipe 12 to the intake passage 16 of the valve casing 14.

The valve heads B and C will be closed by the weights 116, the vapors or gases will flow upwardly past the spider arms 76 into the diaphragm housing.

When the pressure of these gases becomes great enough, the valve heads will be raised.

The degree of pressure necessary to raise the valve heads can be accurately regulated by using a different number of weights 116.

The diaphragm plate 110 is of relatively large diameter. The valves are of light weight and are mounted in the anti-friction ball bearings 82 to make the valve structure extremely sensitive. The large diaphragm assures the sensitivity of the valve control.

The arrangement of the diaphragm with the float 108 affords a liquid seal for the diaphragm and makes it possible to use a metal structure, which will not be affected by acids or the like in the gases or vapors.

As soon as the pressure reaches a certain degree in the tank, the valves are opened, and the vapors flow out through the pipe 120 and are driven by the compressor 122 through the condensing coil 126 to the tank 128, so that no valuable ingredients may be lost.

A gauge 140 is mounted on the float chamber for indicating the height of the oil therein.

It will be seen that by regulating the oil height and the number of weights 116 and on account of the various features of structure hereinbefore described, the valve may be arranged to operate with extreme sensitiveness.

Changes may be made in the details of the structure and arrangement of the various parts of my vapor collecting valve, and it is my purpose and intent to cover by my claims any such changes or any use of mechanical equivalents, which may be reasonably included within the scope of such claims.

I claim as my invention:

1. In a structure of the class described, a valve casing, a valve therein, a diaphragm housing communicating with said casing on one side of the valve, a float chamber in said housing, a diaphragm comprising a float and an imperforate plate operatively connected with said valve, said diaphragm housing communicating with the atmosphere and with the valve casing on opposite sides of the float.

2. In a vapor collecting valve, a valve casing having inlet and outlet passages, a cage in said casing having valve openings, valves for coacting with said openings having a connecting post, a stem member projecting from one of the valves, an anti-friction guide for said stem member, a stem projecting from the other of said valves, an anti-friction guide for said second stem, a diaphragm housing communicating with the valve casing having a float chamber, a diaphragm comprising a float received in said chamber, a connecting plate operatively connected with said second stem, and means for supporting weights on said plate.

3. In a structure of the class described, a valve casing, a valve therein, a diaphragm housing spaced from said casing and communicating on one side therewith, an annular float chamber in the lower part of said housing, a diaphragm including an annular float received in said chamber, a liquid in said float chamber, the surface of said liquid on one side of the float being exposed to the gases in said valve casing and the surface of the liquid on the other side of the float being exposed to the atmosphere, means for operatively connecting said float with the valve.

4. For controlling the flow of liquid through a pipe line by the pressure in the line, a valve in the pipe line and means controllable by said pressure, said means comprising a float chamber, a liquid therein, a float resting in said liquid and operatively connected to the valve, the portion of the float chamber on one side of the float therein being exposed to the pressure in the line whereby the float acts as a diaphragm for actuating the value and the portion of the float chamber on the other side of the float being sealed from the first mentioned portion by the float and the liquid.

5. In a vapor collecting valve, a conducting pipe, a valve casing interposed therein, a cage in said casing having a valve opening, a valve head for cooperating with said opening, a diaphragm housing supported on said casing and having a float chamber, a diaphragm operatively connected with said valve head and comprising a plate having a float on its periphery positioned in said float chamber, a liquid in said chamber for the float to rest in, the liquid and float dividing the chamber into two compartments, one of which communicates with the interior of said valve casing whereby the diaphragm is responsive to pressure within the valve casing.

6. A valve actuating mechanism of the character disclosed comprising a float chamber, a liquid in said chamber, a float supported in said liquid and having a recess in its under surface, and means for introducing pressure into said recess for raising the float, the float being operatively connected with a valve to be controlled by such pressure.

7. A valve actuating mechanism of the character disclosed comprising a float chamber, a liquid in said chamber, a float supported in said liquid and having a recess in its under surface, and means for introducing pressure into said recess for raising the float, said means extending above the level of liquid within the recess in said float, the float being operatively connected with a valve to be controlled by such pressure.

8. A valve actuating mechanism of the character disclosed comprising an annular channel-shaped float chamber, a liquid in said chamber, an annular float supported in said liquid, and imperforate plate above the inner wall of said chamber and having its periphery connected with the annular float whereby the float chamber is divided into two compartments, said plate being operatively connected with a valve and means for introducing pressure into one of said compartments for affecting the operation of said valve.

9. A device of the character disclosed, comprising a valve casing, a valve seat therein, a valve stem extending through said valve seat, a valve member on said stem for cooperating with said valve seat, guiding means for said stem, said means comprising a guide element above and a guide element below said valve seat, a float chamber adjacent said valve casing, a liquid therein, an annular float in said liquid and connected with said valve stem, a space within said float above said liquid and sealed from the exterior of the valve casing by the float and liquid, said space being in communication with the interior of said valve casing, whereby pressure within the valve casing affects the operation of said valve member by the float acting as a pressure actuated diaphragm.

LYLE W. BROWNE.